United States Patent
Inoue et al.

(10) Patent No.: US 11,268,819 B2
(45) Date of Patent: Mar. 8, 2022

(54) CANDIDATE ROUTE PROVIDING SYSTEM, IN-VEHICLE APPARATUS, AND CANDIDATE ROUTE PROVIDING METHOD

(71) Applicant: NISSAN MOTOR CO., LTD., Kanagawa (JP)

(72) Inventors: Hirofumi Inoue, Kanagawa (JP); Masayasu Suzuki, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/738,756

(22) PCT Filed: Jun. 23, 2015

(86) PCT No.: PCT/JP2015/068023
§ 371 (c)(1),
(2) Date: Dec. 21, 2017

(87) PCT Pub. No.: WO2016/207975
PCT Pub. Date: Dec. 29, 2016

(65) Prior Publication Data
US 2018/0188047 A1    Jul. 5, 2018

(51) Int. Cl.
*G01C 21/34*    (2006.01)
*G08G 1/13*    (2006.01)
*G08G 1/01*    (2006.01)

(52) U.S. Cl.
CPC ......... *G01C 21/34* (2013.01); *G01C 21/3484* (2013.01); *G01C 21/3492* (2013.01); *G08G 1/01* (2013.01); *G08G 1/13* (2013.01)

(58) Field of Classification Search
CPC ................................. G01C 21/34; G08G 1/13
See application file for complete search history.

(56) References Cited

U.S. PATENT DOCUMENTS

| 5,931,888 | A | 8/1999 | Hiyokawa |
| 6,405,130 | B1 | 6/2002 | Piwowarski |
| 9,857,191 | B2 * | 1/2018 | Mason ............... G01C 21/3492 |
| 2004/0049340 | A1 | 3/2004 | Usui |

(Continued)

FOREIGN PATENT DOCUMENTS

| EP | 2265898 A1 | 12/2010 |
| JP | 2004-101212 A | 4/2004 |

(Continued)

*Primary Examiner* — Mathew Franklin Gordon
(74) *Attorney, Agent, or Firm* — Osha Bergman Watanabe & Burton LLP

(57) ABSTRACT

A candidate route providing system that provides a vehicle with a candidate route as a candidate of a travel route, based on traveled paths of a plurality of vehicles includes a storage that stores the traveled paths of the plurality of vehicles and travel history information associated with the traveled paths, a current location setter that sets a current location of the vehicle, a passage candidate point setter that sets a passage candidate point selectable by the vehicle to pass through, within a predetermined range being a distance range between a lower-limit distance and an upper-limit distance from the current location, a path extractor that extracts, from the traveled paths, traveled paths that pass through the current location and the passage candidate point, and a candidate route selector.

16 Claims, 7 Drawing Sheets

(56) References Cited

U.S. PATENT DOCUMENTS

| | | | |
|---|---|---|---|
| 2004/0260465 A1* | 12/2004 | Tu | G01C 21/3679 |
| | | | 701/426 |
| 2009/0105934 A1 | 4/2009 | Tajima et al. | |
| 2011/0087429 A1 | 4/2011 | Trum | |
| 2011/0224898 A1 | 9/2011 | Scofield et al. | |
| 2014/0032096 A1 | 1/2014 | Chan | |
| 2015/0338226 A1* | 11/2015 | Mason | G01C 21/3605 |
| | | | 701/408 |
| 2018/0010920 A1* | 1/2018 | Poppen | G01C 21/3617 |

FOREIGN PATENT DOCUMENTS

| | | |
|---|---|---|
| JP | 2004-205450 A | 7/2004 |
| JP | 2008-152467 A | 7/2008 |
| JP | 2008-241478 A | 10/2008 |
| JP | 2011-185854 A | 9/2011 |
| JP | 2012-057955 A | 3/2012 |
| JP | 2012-063260 A | 3/2012 |
| JP | 2014-009948 A | 1/2014 |
| WO | 2007/119559 A1 | 10/2007 |
| WO | 2010/072258 A1 | 7/2010 |
| WO | 2012/054533 A1 | 4/2012 |

* cited by examiner

CANDIDATE ROUTE PROVIDING SYSTEM, IN-VEHICLE APPARATUS, AND CANDIDATE ROUTE PROVIDING METHOD

BACKGROUND

Technical Field

The present invention relates to a candidate route providing system and a candidate route providing method for determining the position of a vehicle.

Related Art

For a navigation apparatus that presents information about a route to a set destination, there is known a technique that proposes a route suitable for travel of a vehicle by referring to a history of routes that the vehicle traveled in the past, each route having given points on roads as its start point and terminal point (Patent Literature 1).

Patent Literature 1: Japanese Patent Application Publication No. 2008-241478

SUMMARY

In the technique in Patent Literature 1, however, the navigation apparatus makes route evaluations using the travel history of the host vehicle, and therefore the route evaluations cannot target roads that the vehicle has not traveled before.

One or more embodiments of the present invention provides a candidate route providing system, an in-vehicle apparatus, and a candidate route providing method capable of providing a candidate route accurately from various travel routes.

From a storage that stores traveled paths of a plurality of vehicles and travel history information associated with the traveled paths, a candidate route providing system extracts traveled paths that pass through the current location of a vehicle and a passage candidate point within a predetermined range determined based on the current location. Based on the travel history information associated with the extracted traveled paths, the candidate route providing system selects at least one of the traveled paths as a candidate route to provide to the vehicle.

The present invention can provide a candidate route providing system, an in-vehicle apparatus, and a candidate route providing method capable of providing a candidate route accurately from various travel routes by selecting the candidate route based on traveled paths of a plurality of vehicles.

DETAILED DESCRIPTION

Figure 1:
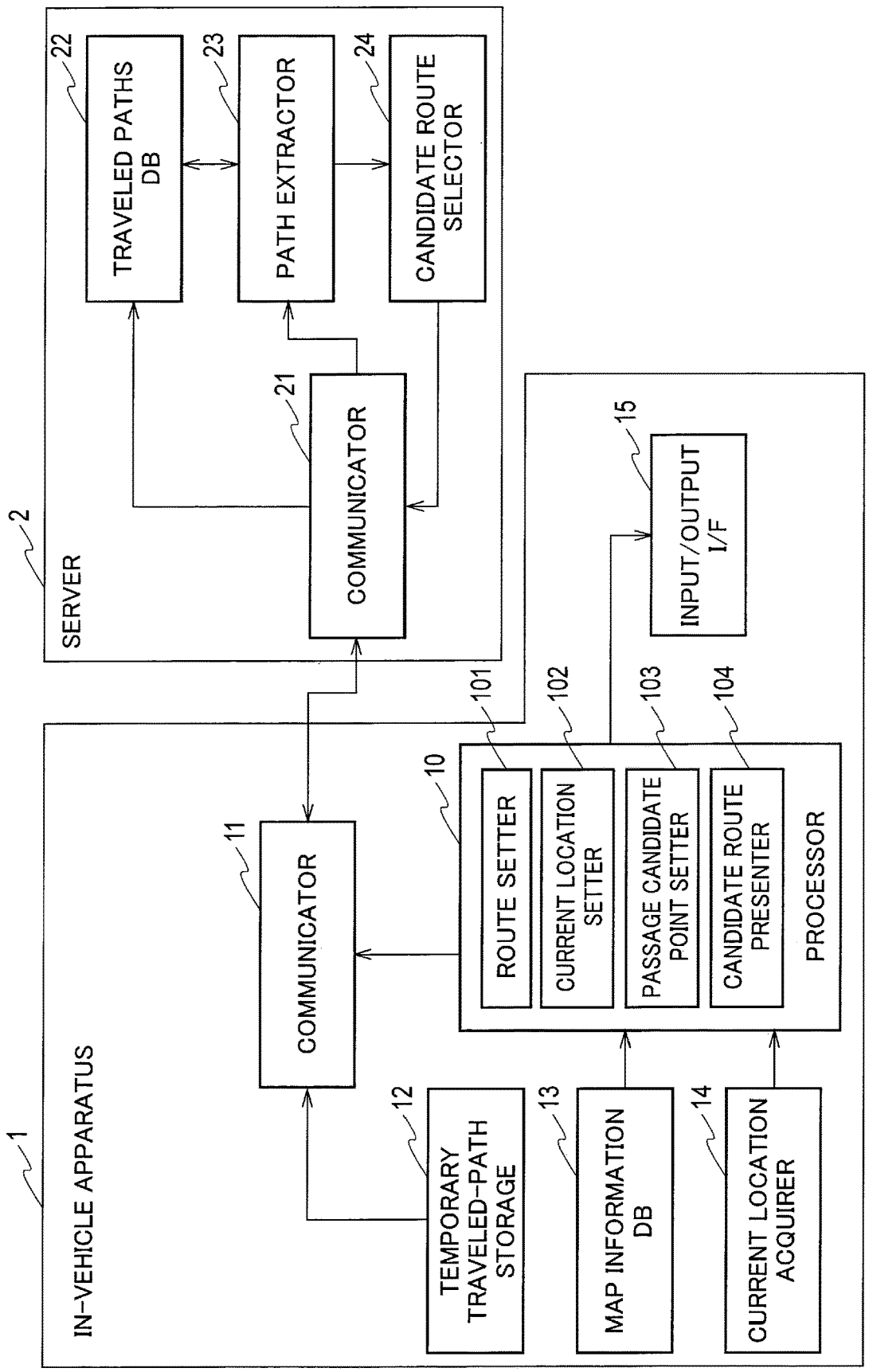
FIG. 1 is a block diagram illustrating an example configuration of a candidate route providing system according to a first embodiment of the present invention.

Embodiments of the present invention are described with reference to the drawings. Throughout the drawings, the same or similar reference numerals denote the same or similar elements, and overlapping descriptions are omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 2:
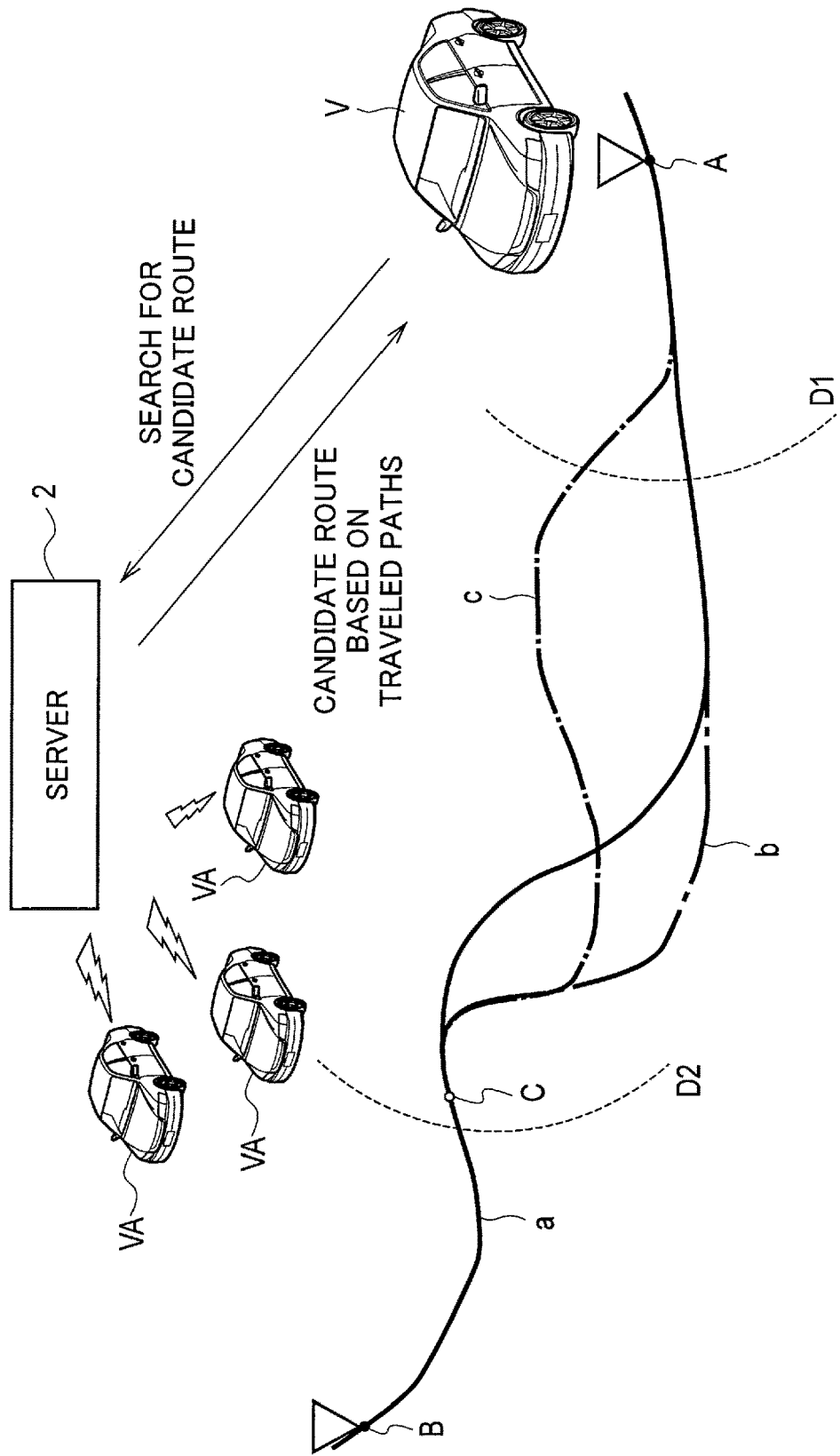
FIG. 2 is a block diagram illustrating how the candidate route providing system according to the first embodiment of the present invention operates.

As illustrated in FIG. 1, a candidate route providing system according to a first embodiment of the present invention includes an in-vehicle apparatus 1 mounted in a vehicle V (see FIG. 2) and a server 2 that wirelessly communicates with the in-vehicle apparatus 1. As illustrated in FIG. 2, the candidate route providing system according to the first embodiment provides the vehicle V with a candidate route that the vehicle V may travel, based on traveled paths of a plurality of vehicles (other vehicles) VA.

The in-vehicle apparatus 1 includes, for example, a processor 10, a communicator 11, a temporary traveled-path storage 12, a map information database (DB) 13, a current location acquirer 14, and an input/output interface (I/F) 15.

The map information DB 13 has map information recorded therein, such as road information and facility information. The map information DB 13 can be formed by a storage device such as semiconductor memory or a magnetic disk. The current location acquirer 14 acquires the current location on the map using a position measurement device, such as a receiver for a global positioning system (GPS), and vehicle sensors, such as a velocity sensor, an acceleration sensor, an angular velocity sensor, and a steering angle sensor. The current location acquirer 14 outputs acquired current locations sequentially to the processor 10.

Based on the current locations of the vehicle V acquired by the current location acquirer 14, the temporary traveled-path storage 12 temporarily stores the traveled path of the vehicle V cyclically. The communicator 11 is a transmitter that wirelessly transmits and receives signals to and from the server 2 as controlled by the processor 10. The communicator 11 transmits the traveled path stored in the temporary traveled-path storage 12 to the server 2 at predetermined timing.

The input/output I/F 15 is formed by a display device such as a liquid crystal display that displays images and/or text, a loudspeaker that outputs audio, an input device that receives an operation input from a user, and the like. The input/output I/F 15 displays an image and/or text as controlled by the processor 10. The input/output OF 15 outputs a signal to the processor 10 in accordance with an operational input from a user.

The processor 10 has a route setter 101, a current location setter 102, a passage candidate point setter 103, and a candidate route presenter 104. The processor 10 can be formed by, for example, a microcontroller being an integrated circuit including a central processing unit (CPU), memory, an input/output I/F, and the like. In this case, the CPU executes computer programs preinstalled in the microcontroller, thereby implementing the information processors (101 to 104) that constitute the processor 10. The constituents of the processor 10 may be formed by a single hardware element or by separate hardware elements. The microcontroller may double as an electronic control unit (ECU) used for controlling other aspects of the vehicle V.

The route setter 101 sets a travel route of the vehicle V from the current location of the vehicle V to the destination, in the map information DB 13 as a set route. The destination is set through the input/output I/F 15 according to an operation input from a user, for example. The processor 10 has a navigation function to guide the vehicle V to the destination following the set route.

The current location setter 102 sets the current location acquired by the current location acquirer 14, as the start point of a candidate route that the vehicle V may travel. The passage candidate point setter 103 sets that a passage candidate point selectable by the vehicle to pass through, within a predetermined search range determined based on the current location of the vehicle V, as the terminal point of a candidate route that the vehicle V may travel. The processor 10 transmits a search request to the server 2 through the communicator 11 to request a search for a candidate route that passes through the current location set by the current location setter 102 and the passage candidate point set by the passage candidate point setter 103.

The search range used by the passage candidate point setter 103 is, for example as shown in FIG. 2, a distance range from points a lower-limit distance D1 away from the current location A of the vehicle V to points an upper-limit distance D2 away from the current location A of the vehicle V. The lower-limit distance D1 is a distance for ensuring that there is a candidate route that diverges from a set route and meets the set route again. The upper-limit distance D2 is a distance for limiting the number of traveled paths that may be selected as a candidate route. For instance, the passage candidate point setter 103 sets a passage candidate point C at a traffic intersection which is on a set route a to a destination B and is farthest away from the vehicle V within the search range.

The candidate route presenter 104 presents a candidate route selected by the server 2 to the user using the input/output I/F 15. The candidate route presenter 104 may present the candidate route using a map in which corresponding roads are highlighted, or by display or audio indicating the time period of travel, the distance of travel, the frequency of travel, passage points on the candidate route, and the like. The candidate route presenter 104 may present more than one candidate route based on a predetermined condition.

The server 2 includes a communicator 21, a traveled paths DB 22, a path extractor 23, and a candidate route selector 24. The communicator 21 transmits and receives signals to and from a plurality of vehicles VA and the vehicle V. The communicator 21 receives a traveled path transmitted from each of the vehicles VA and travel history information associated with the traveled path. The communicator 21 transmits information on a candidate route selected based on the traveled paths and the travel history information.

The traveled paths DB 22 is a storage that stores therein traveled paths of the respective vehicles VA and travel history information associated with the traveled paths. The traveled paths DB 22 can be formed by a storage device such as semiconductor memory or a magnetic disk. The travel history information from each of the vehicles VA includes, for example, the time it took for the vehicle VA to travel the route indicated by the traveled path, the time slot in which the vehicle VA traveled the route, the day of the week on which the vehicle VA traveled the route, and the vehicle attribute of the vehicle VA, such as its vehicle size or model.

In response to a search request transmitted from the in-vehicle apparatus 1 and received via the communicator 21, the path extractor 23 extracts traveled paths that pass through the current location of the vehicle V and the passage candidate point, from the plurality of traveled paths stored in the traveled paths DB 22. The traveled paths extracted by the path extractor 23 each have the current location of the vehicle V as its start point and the passage candidate point as its terminal point.

Based on the travel history information associated with each of the traveled paths extracted by the path extractor 23, the candidate route selector 24 selects at least one of the traveled paths as a candidate route to provide to the vehicle V. The candidate route selector 24 divides the traveled paths extracted by the path extractor 23 into groups of traveled paths of the same route as path clusters, and performs cluster analysis on each path cluster using the travel history information. By the cluster analysis, the candidate route selector 24 determines path clusters representing the most-frequently-traveled route, the shortest travel time route, the shortest travel distance route, and the like, and selects a candidate route from these routes. The candidate route selector 24 transmits information on the selected candidate route to the vehicle V via the communicator 21 as a response to the search request.

For instance, in the example shown in FIG. 2, the candidate route selector 24 selects two candidate routes b and c as candidate routes to the passage candidate point C, and information on these candidate routes b and c are transmitted to the vehicle V as candidate route information. For instance, among the path clusters, the candidate route b is the shortest travel route, and the candidate route c is the shortest travel time route.

Using the input/output I/F 15, the candidate route presenter 104 presents the candidate route that meets the priority setting made by the user in advance. For instance, if a priority setting for a candidate route specifies the shortest travel time route, the candidate route presenter 104 presents the candidate route c to the user. Alternatively, the candidate route presenter 104 may present all the selected candidate routes along with the priority setting.

The candidate route selector 24 possibly selects a candidate route indicating the same route as the set route a, which is the travel route already set. In such a case, the candidate route selector 24 may select a candidate route different from the set route a, or may select a candidate route indicating the same route as the set route a. If a candidate route indicating the same route as the set route a is selected, the candidate route presenter 104 may omit the candidate route indicating the same route as the set route a. Thereby, the candidate route presenter 104 can prevent the user from being presented with too much information. Alternatively, if a candidate route indicating the same route as the set route a is selected, the candidate route presenter 104 may present the candidate route along with a priority setting. Thereby, the candidate route presenter 104 can present the candidate route while reflecting the intention of the user in the presentation.

Figure 3:
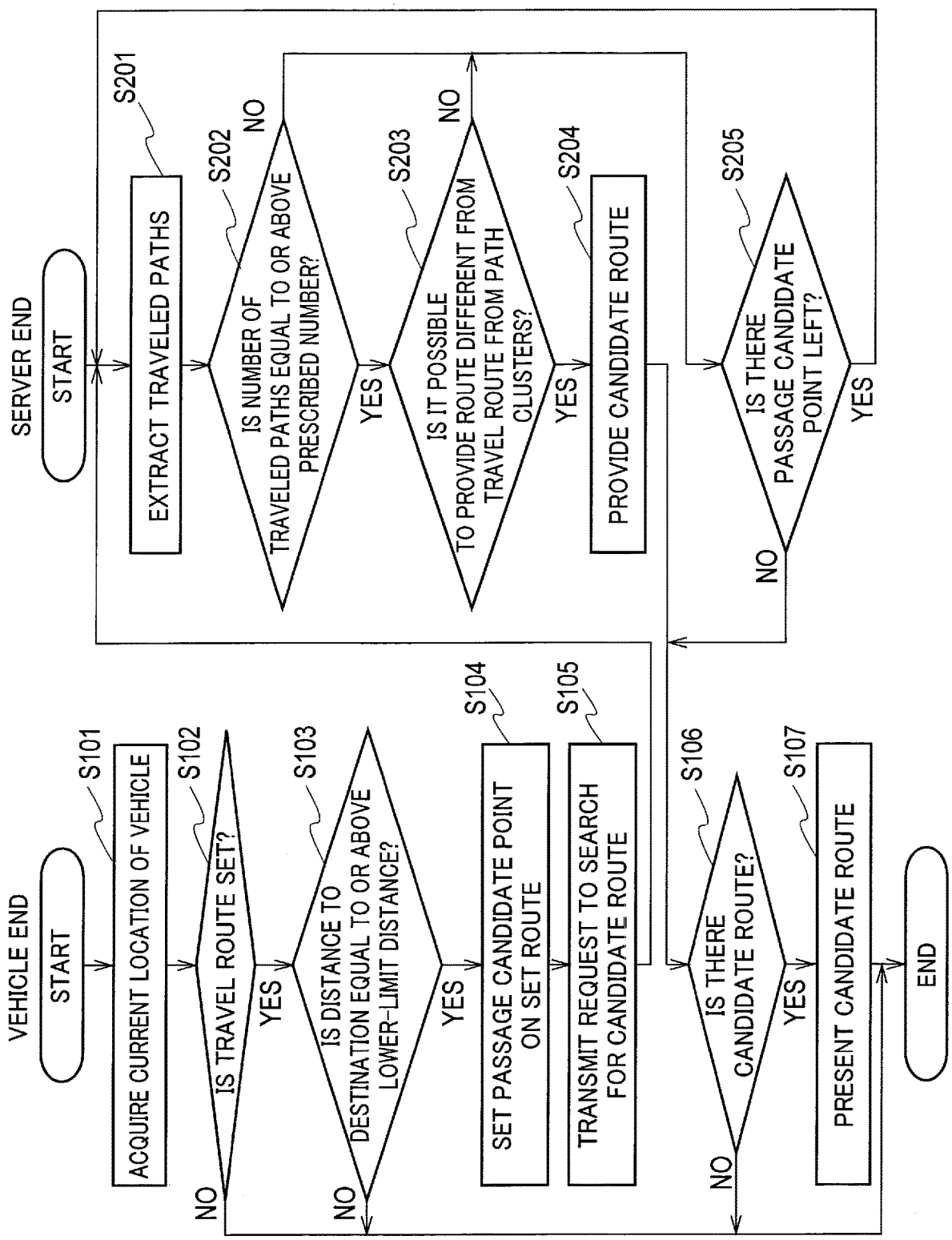
FIG. 3 is a flowchart illustrating a candidate route providing method performed by the candidate route providing system according to the first embodiment of the present invention.

With reference to a flowchart in FIG. 3, a description is given of an example of a candidate route providing method that uses the candidate route providing system according to the first embodiment.

First, in Step S101, the current location acquirer 14 acquires the current location of the vehicle V and inputs it to the processor 10. The current location setter 102 sets the current location acquired by the current location acquirer 14 as the start point of a candidate route which the vehicle V may travel.

In Step S102, the passage candidate point setter 103 determines whether a travel route of the vehicle V is set by the route setter 101. The passage candidate point setter 103 causes the processing to proceed to Step S103 if a travel route is set, or ends the processing if a travel route is not set.

In Step S103, the passage candidate point setter 103 determines whether the distance to the destination of the set route is either equal to or above the lower-limit distance of a search range. The passage candidate point setter 103 causes the processing to proceed to Step S104 if the distance to the destination is equal to or above the lower-limit distance, or ends the processing if the distance to the destination is not equal to or above the lower-limit distance.

In Step S104, the passage candidate point setter 103 sets a passage candidate point on the set route within the search range. For instance, the passage candidate point setter 103 sets three passage candidate points on the set route: two at the upper-limit distance and the lower-limit distance of the search range and one at the midpoint of these two points.

In Step S105, the processor 10 transmits a search request to the server 2 via the communicator 11 to request a search for a candidate route that passes through both the current location set by the current location setter 102 and the passage candidate point set by the passage candidate point setter 103.

In response to the search request received from the in-vehicle apparatus 1 via the communicator 21, in Step S201 the path extractor 23 extracts, from traveled paths stored in the traveled paths DB 22, traveled paths having the current location of the vehicle V as the start point and the passage candidate point as the terminal point. If there is more than one passage candidate point, the path extractor 23 extracts traveled paths to the passage candidate point in descending order of the distance from the current location. The extraction of traveled paths by the path extractor 23 targets one passage candidate point in each iteration of Step S201.

In Step S202, the path extractor 23 determines whether the number of the traveled paths extracted in Step S201 is either equal to or above a prescribed number. The path extractor 23 causes the processing to proceed to Step S203 if the number of the traveled paths is equal to or above the prescribed number, or to Step S205 if the number of the traveled paths is not equal to or above the prescribed number.

In Step S203, the candidate route selector 24 determines whether it is possible to provide the in-vehicle apparatus 1 with a candidate route different from the set route from path clusters formed by dividing the traveled paths extracted by the path extractor 23 into groups of traveled paths of the same route. The candidate route selector 24 selects a candidate route by performing clustering analysis on each path cluster using the travel history information. If the search request has a priority setting, the candidate route selector 24 selects the candidate route based on the priority setting. The candidate route selector 24 causes the processing to proceed to Step S204 if a candidate route different from the set route is selected, or to Step S205 if a candidate route different from the set route is not selected.

In Step S204, the candidate route selector 24 transmits information on the selected candidate route to the in-vehicle apparatus 1 via the communicator 21 as a response to the search request.

In Step S205, the candidate route selector 24 determines whether there is any other passage candidate point specified in the search request, for which traveled paths have not been extracted yet in Step S201. The candidate route selector 24 causes the processing to proceed back to Step S201 if there is a passage candidate point left, or transmits a response to the in-vehicle apparatus 1 via the communicator 21 if there is no passage candidate point left, the response indicating that there is no candidate route to provide.

In Step S106, the candidate route presenter 104 refers to the response received from the server 2 via the communicator 11 and determines if any candidate route has been provided. The candidate route presenter 104 causes the processing to proceed to Step S107 if there is a candidate route, or ends the processing if there is no candidate route.

In Step S107, the candidate route presenter 104 presents the candidate route provided by the server 2 to the user using the input/output I/F 15, and ends the processing. The series of processing shown in the flowchart in FIG. 3 is started by the in-vehicle apparatus 1 end, triggered by an event such as activation of the in-vehicle apparatus 1 or an operational input from a user, and the processing on the in-vehicle apparatus 1 end is repeated in predetermined cycles.

As described above, the candidate route providing system according to the first embodiment extracts, from traveled paths of a plurality of vehicles, traveled paths that the vehicle V may travel to get to the passage candidate point from the current location, and selects a candidate route based on their travel histories. Thereby, the candidate route providing system according to the first embodiment can provide a candidate route accurately from various travel routes.

The candidate route providing system according to the first embodiment selects a candidate route whose start point and terminal point are on the set route. Thus, even if user's intention newly arises while the vehicle V is travelling on the set route, the candidate route providing system according to the first embodiment can select a candidate route with high accuracy based on a large number of traveled paths.

The candidate route providing system according to the first embodiment can select a candidate route in accordance with a priority setting, based on information on travel histories of a plurality of vehicles. For instance, a traveled path which is traveled most frequently is a route which is easy to travel for many people, and a traveled path with the shortest time of travel is expected to be a route which takes the shortest time for many people. Thus, the candidate route providing system according to the first embodiment can select a route desired by the user with high accuracy from traveled paths of a plurality of vehicles.

Further, the candidate route providing system according to the first embodiment can select a candidate route based on at least one of the time slot, the day of the week, or the vehicle attribute associated with each of traveled paths. Thus, the candidate route providing system can select a candidate route with even higher accuracy if the processor 10 specifies, in the search request, the current time slot, the current day of the week, the vehicle attribute of the vehicle V, and/or the like. The processor 10 may specify the identifier (ID) of the vehicle V in the search request. By having the identifier and model information of each vehicle stored in association with each other, the server 2 can know the vehicle attribute of the host vehicle V of the in-vehicle apparatus 1 transmitting the search request.

The candidate route providing system according to the first embodiment can select a candidate route suitable for the vehicle V by using the vehicle's size as a vehicle attribute. For instance, if the vehicle V is a large-size vehicle, the candidate route providing system according to the first embodiment can exclude, from candidate routes, routes for which there is no travel history of large-size vehicles, because it is expected that such routes are difficult for large-size vehicles to travel. In this way, the candidate route providing system can select a candidate route suitable for the vehicle V with high accuracy.

If more than one passage candidate point is set, the candidate route providing system according to the first embodiment starts the extraction preferentially from traveled paths with the longest distance from the current location to the passage candidate point. Thereby, the candidate route providing system can increase the population parameters of clustering analysis with respect to traveled paths and select a candidate route with high accuracy.

[Modification]

Figure 4:
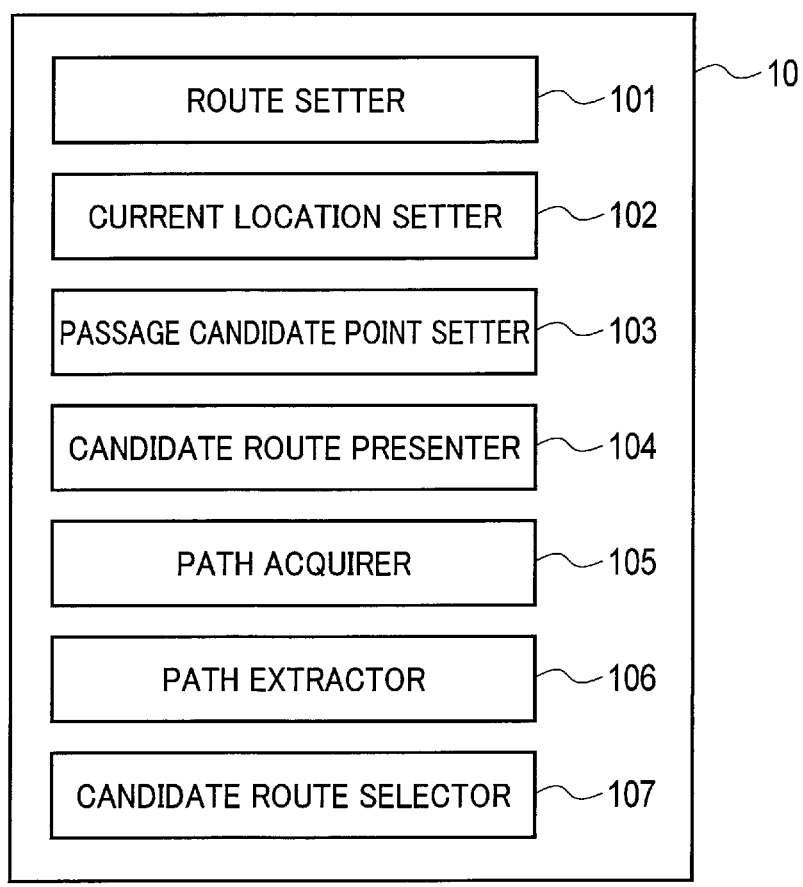
FIG. 4 is a block diagram illustrating the configuration of a processor in a candidate route providing system according to a modification of the first embodiment of the present invention.

In the flowchart of FIG. 3, the processing on the left side is performed by the in-vehicle apparatus 1, and the processing on the right side is performed by the server 2. This is however a mere example, and whether each processing is to be executed by the in-vehicle apparatus 1 or by the server 2 is not limited to what is shown in that flowchart. For instance, the in-vehicle apparatus 1 may extract traveled paths, which may become a candidate route, from a plurality of traveled paths acquired from the server 2. The candidate route providing system according to a modification of the first embodiment is different from the first embodiment in that, for example, the processor 10 of the in-vehicle apparatus 1 further includes, as illustrated in FIG. 4, a path acquirer 105, a path extractor 106, and a candidate route selector 107.

The path acquirer 105 acquires, from the server 2, traveled paths around the current location acquired by the current location acquirer 14 and travel history information associated therewith. For example, the path acquirer 105 transmits a path request to the server 2 via the communicator 11 to request traveled paths around the current location and travel history information associated therewith. In response to the path request, the server 2 reads traveled paths around the current location and associated travel history information from the traveled paths DB 22 and transmits them to the in-vehicle apparatus 1 via the communicator 21.

From the traveled paths acquired by the path acquirer 105, the path extractor 106 extracts traveled paths passing through the current location of the vehicle V and the passage candidate point. Based on the travel history information associated with the traveled paths extracted by the path extractor 106, the candidate route selector 107 selects at least one of the traveled paths as a candidate route that the vehicle V may travel. Other points about the path extractor 106 and the candidate route selector 107 are substantially the same as those of the path extractor 23 and the candidate route selector 24; thus, descriptions are omitted.

Further, the processing performed by the passage candidate point setter 103 may be performed on the server 2 end. In addition, the processing performed by the current location setter 102 does not necessarily have to be performed by the in-vehicle apparatus 1, and may be, for example, performed on another computer, which sets a given point on a map to the current location of the vehicle V.

Second Embodiment

Figure 5:
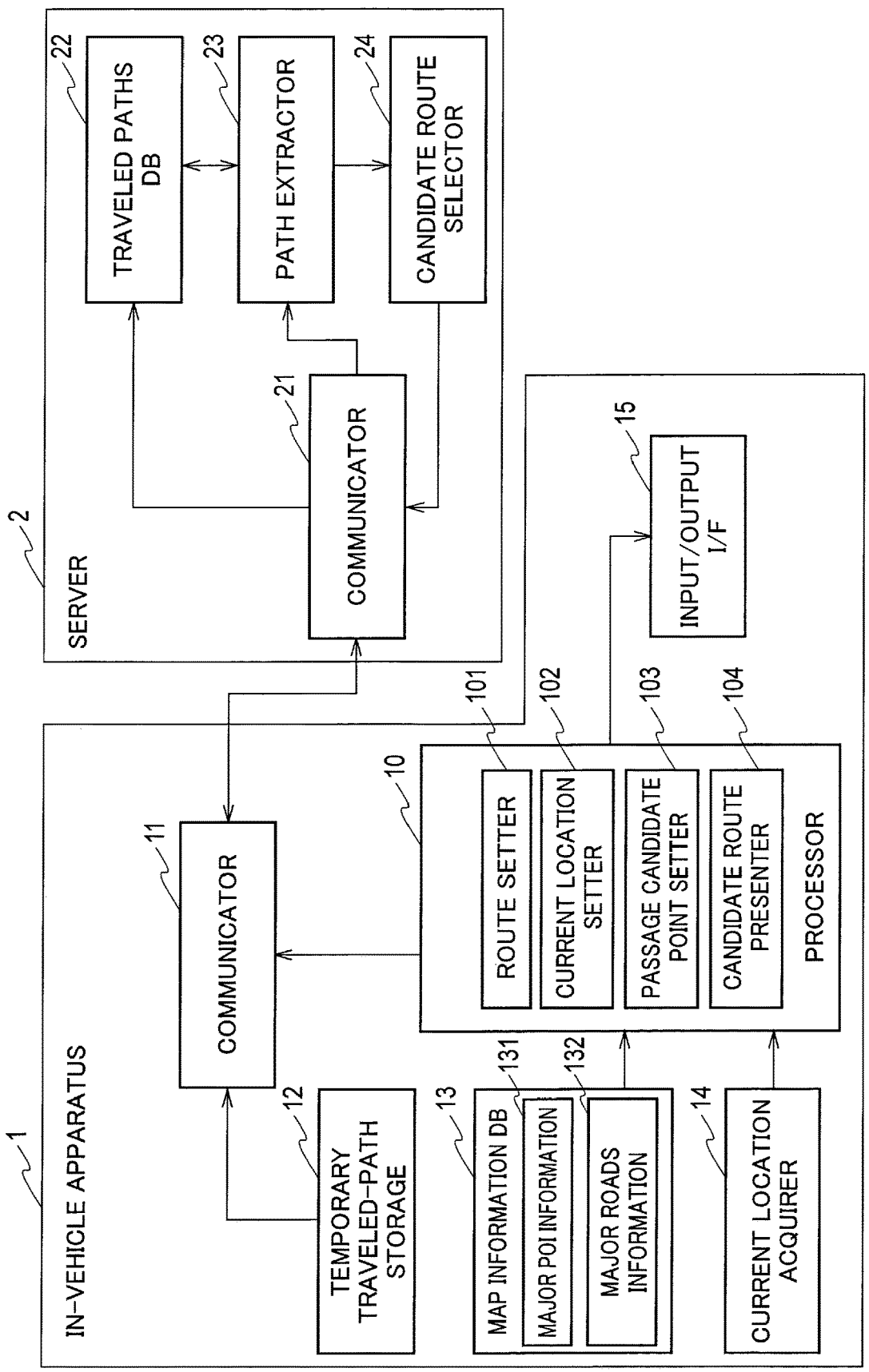
FIG. 5 is a block diagram illustrating an example configuration of a candidate route providing system according to a second embodiment of the present invention.

A candidate route providing system according to a second embodiment of the present embodiment is different from the first embodiment in that, for example, the map information DB 13 of the in-vehicle apparatus 1 stores major POI information 131 and major roads information 132 as shown in FIG. 5. Other configurations, operations, and advantageous effects not described in the second embodiment are substantially the same as those of the first embodiment, and overlapping descriptions are omitted.

The major POI information 131 is information on points of interest (POI) predefined in map information. Examples of a major POI include a train station, an interchange (IC), and a facility such as a store. The major roads information 132 is information on major roads predefined in the map information. Examples of a major road include a national road, a limited highway, and an expressway.

Figure 6:
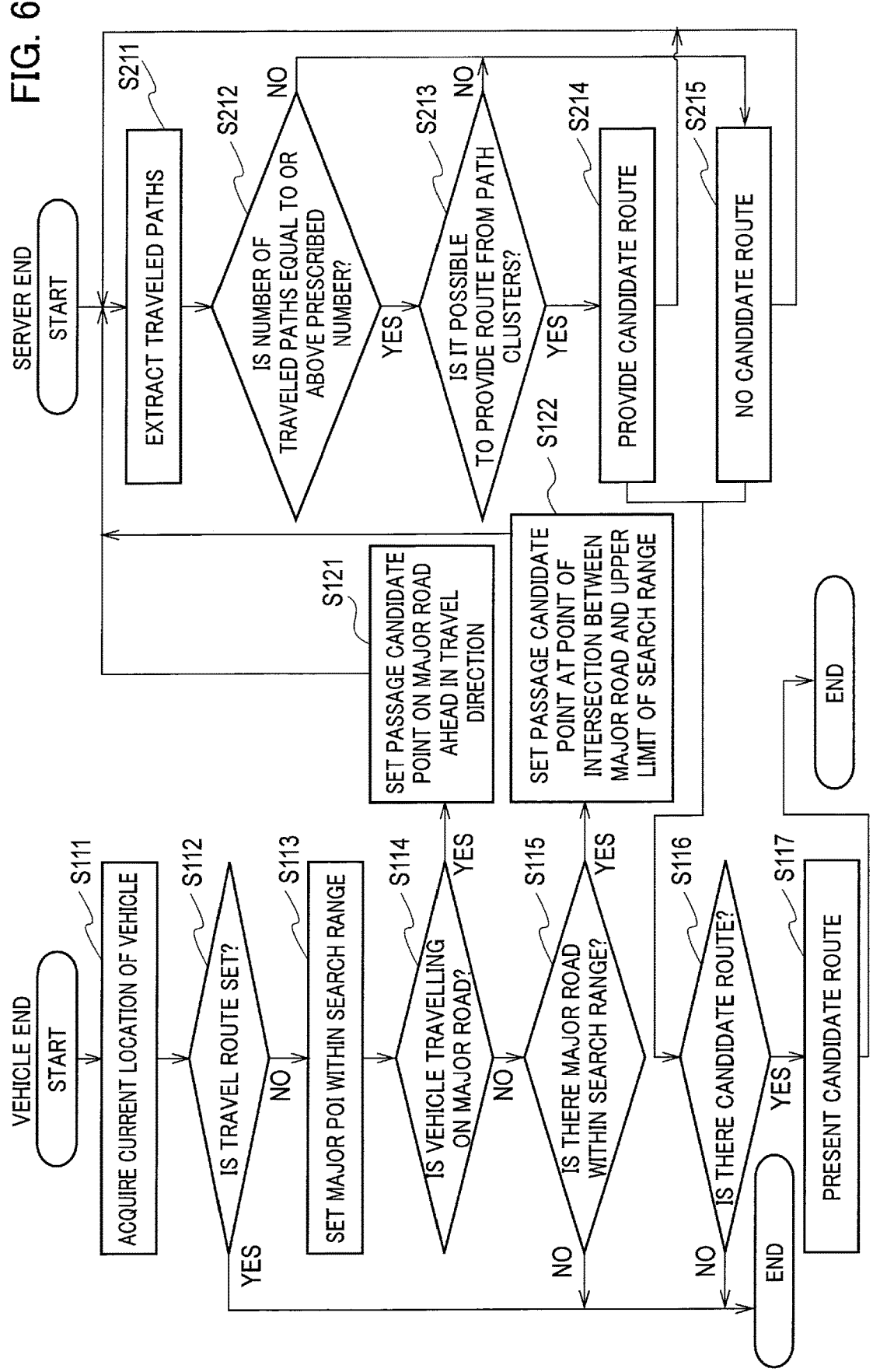
FIG. 6 is a flowchart illustrating a candidate route providing method performed by the candidate route providing system according to the second embodiment of the present invention.

With reference to a flowchart in FIG. 6, a description is given of an example of a candidate route providing method that uses the candidate route providing system according to the second embodiment.

First, in Step S111, the current location acquirer 14 acquires the current location of the vehicle V and inputs it to the processor 10. The current location setter 102 sets the current location acquired by the current location acquirer 14 as the start point of a candidate route that the vehicle V may travel.

In Step S112, the passage candidate point setter 103 determines whether a travel route of the vehicle V is set by the route setter 101. The passage candidate point setter 103 causes the processing to proceed to Step S113 if a travel route is not set, or ends the processing if a travel route is set.

Figure 7:
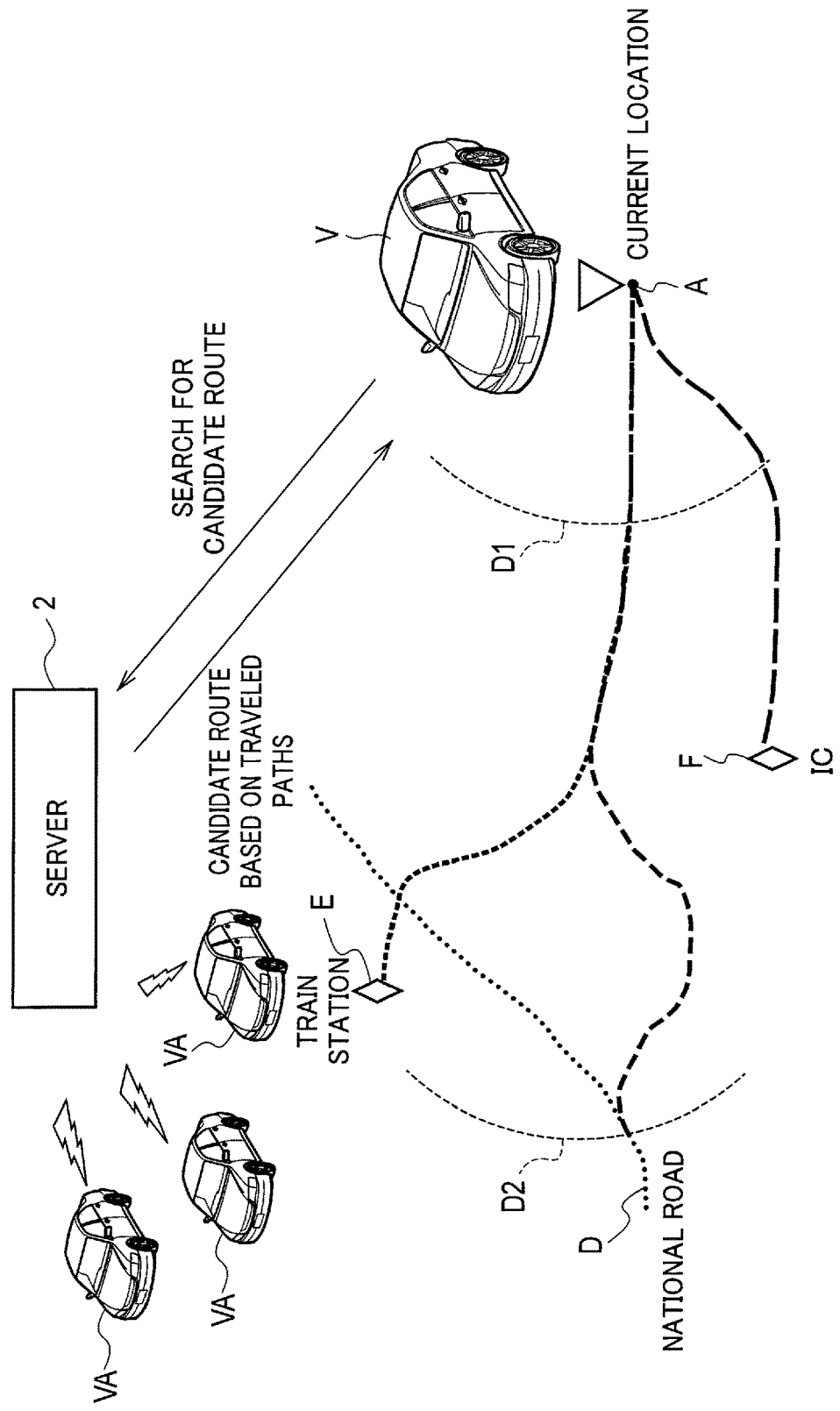
FIG. 7 is a block diagram illustrating how the candidate route providing system according to the second embodiment of the present invention operates.

In Step S113, the passage candidate point setter 103 refers to the major POI information 131 and searches for a major POI located within a search range determined based on the current location of the vehicle V (a distance range from the lower-limit distance D1 to the upper-limit distance D2). If there is a major POI within the search range, the passage candidate point setter 103 sets the major POI as a passage candidate point. If there is no major POI, the processing proceeds directly to Step S114. In an example shown in FIG. 7, a train station E and an interchange F, which are major POI, are located within the search range, so the train station E and the interchange F are set as passage candidate points.

In Step S114, the passage candidate point setter 103 refers to the major roads information 132 and determines whether the road on which the vehicle V is currently travelling is a major road. The passage candidate point setter 103 causes the processing to proceed to Step S121 if the current road is a major road, or to Step S115 if the current road is not a major road.

In Step S121, the passage candidate point setter 103 sets a passage candidate point within the search range on the major road ahead in the travel direction. For instance, the passage candidate point setter 103 sets three passage candidate points: two at the upper-limit distance and the lower-limit distance of the search range on the major road and one at the midpoint of the two points. In the example shown in FIG. 7, a national road D, which is a major road, is located within the search range. Thus, a point on the major road D within the range between the upper-limit distance D2 from the current location A and the lower-limit distance D1 from the current location A is set as a passage candidate point. The processor 10 transmits a search request to the server 2 via the communicator 11 to request a search for a candidate route that passes through both the current location set by the current location setter 102 and each passage candidate point set by the passage candidate point setter 103.

In Step S115, the passage candidate point setter 103 refers to the major roads information 132 and determines whether there is a major road in the search range. The passage candidate point setter 103 causes the processing to proceed to Step S122 if there is a major road, or ends the processing if there is no major road.

In Step S122, the passage candidate point setter 103 sets a passage candidate point at a point which is on the major road and is the upper-limit distance D2 away from the current location. If there are three or more points which are the upper-limit distance away from the current location, the passage candidate point setter 103 sets passage candidate points at two points that have the longest distance on the major road among these point. The processor 10 transmits a search request to the server 2 via the communicator 11 to request a search for a candidate route that passes through both the current location set by the current location setter 102 and the passage candidate point set by the passage candidate point setter 103.

In response to the search request received from the in-vehicle apparatus 1 via the communicator 21, in Step S211 the path extractor 23 extracts, from traveled paths stored in the traveled paths DB 22, traveled paths having the current location of the vehicle V as the start point and the passage candidate point as the terminal point.

In Step S212, the path extractor 23 determines whether the number of the traveled paths extracted in Step S211 is either equal to or above a prescribed number. The path extractor 23 causes the processing to proceed to Step S213 if the number of the traveled paths is equal to or above the prescribed number, or to Step S215 if the number of the traveled paths is not equal to or above the prescribed number.

In Step S213, the candidate route selector 24 determines whether it is possible to provide the in-vehicle apparatus 1 with a candidate route from path clusters formed by dividing the traveled paths extracted by the path extractor 23 into groups of traveled paths of the same route. If the search request has a priority setting, the candidate route selector 24 selects the candidate route in accordance with the priority setting. The candidate route selector 24 causes the processing to proceed to Step S214 if a candidate route is selected, or to Step S215 if a candidate route is not selected.

As a response to the search request, in Step S214 the candidate route selector 24 transmits information on the selected candidate route to the in-vehicle apparatus 1 via the communicator 21. In Step S215, the candidate route selector 24 transmits a response to the in-vehicle apparatus 1 via the communicator 21, indicating that there is no candidate route to provide.

In Step S116, the candidate route presenter 104 refers to the response received from the server 2 via the communicator 11, and determines whether a candidate route has been provided. The candidate route presenter 104 causes the processing to proceed to Step S117 if there is a candidate route, or ends the processing if there is no candidate route.

In Step S117, the candidate route presenter 104 presents the candidate route provided by the server 2 to the user using the input/output I/F 15, and ends the processing.

As described above, the candidate route providing system according to the second embodiment selects a candidate route whose terminal point is a major POI in the search range. Thus, even if user's intention newly arises while the vehicle V is travelling, a candidate route can be selected with high accuracy based on a large number of traveled paths.

Further, the candidate route providing system according to the second embodiment sets a passage candidate point at a point which is on a major road and is the upper-limit distance D2 away from the current location. Thus, in a situation such as where the user wants to enter the major road, a candidate route to the major road can be selected with high accuracy.

Further, if there are three or more points on a major road which are the upper-limit distance D2 away from the current location, the candidate route providing system according to the second embodiment sets passage candidate points at two points that have the longest distance on the major road among these points. Thus, if the user wants to enter the major road, the candidate route providing system according to the second embodiment can select candidate routes in the inbound direction and the outbound direction of the major road with high accuracy.

Further, when the vehicle V is travelling on a major road, the candidate route providing system according to the second embodiment sets a passage candidate point on the major road within the search range. Thus, even if user's intention newly arises while the vehicle V is traveling, a candidate route can be selected with high accuracy.

Further, the candidate route providing system according to the second embodiment selects a candidate route only when a travel route is not set, preventing the user from being presented with too much information.

Other Embodiments

As described above, the details of the present invention have been disclosed using specific embodiments of the present invention. However, the description and drawings which constitute part of this disclosure are not intended to limit the present invention. From this disclosure, various alternative embodiments, examples, and operation techniques will be easily found by those skilled in the art. For example, it goes without saying that the present invention includes various other embodiments and the like which are not described herein, such as a configuration in which the configurations described above are applied to one another. Accordingly, the technical scope of the present invention should be determined only by the matters to define the invention in the scope of claims regarded as appropriate based on the description.

Functions described in the first and second embodiments may be executed by one or more processing circuits. Processing circuits include a programmed processing device such as a processing device including electrical circuitry. The processing circuit may include a device designed to execute the functions described, such as an application specific integrated circuit (ASIC) or a circuit component.

One or more embodiments of the present invention provides a candidate route providing system, an in-vehicle apparatus, and a candidate route providing method capable of providing a candidate route accurately from various travel routes by selecting the candidate route based on traveled paths of a plurality of vehicles.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

V, VA vehicle
1 in-vehicle apparatus
2 server
22 traveled paths DB (storage)
23 path extractor
24 candidate route selector
101 route setter
102 current location setter
103 passage candidate point setter
104 candidate route presenter
105 path acquirer
106 path extractor
107 candidate route selector
131 major POI (major point) information
132 major roads information

The invention claimed is:

1. A candidate route providing system that provides a host vehicle with a candidate route as a candidate of a travel route, based on traveled paths of a plurality of other vehicles, comprising:
a storage that stores the traveled paths of the plurality of other vehicles and travel history information associated with the traveled paths of the plurality of other vehicles; and
a processor,
wherein the processor sets a current location of the host vehicle,
wherein the processor sets a passage candidate point selectable by the host vehicle to pass through, within a predetermined range being a distance range between a lower-limit distance that is greater than zero and an upper-limit distance from the current location, by searching within the predetermined range, automatically excluding the distance range less than the lower-limit distance regardless of distance from the current location to a destination of the vehicle,
wherein the processor extracts, from the traveled paths of the plurality of other vehicles, mutually different traveled paths each having the current location of the host vehicle as a starting point of the traveled path and the passage candidate point as a terminal point of the traveled path,
wherein the processor selects, as the candidate route to provide to the host vehicle, at least one of the traveled paths extracted by the processor based on the travel history information associated with the traveled paths extracted by the processor, and
wherein, when a plurality of the passage candidate points are set, the processor preferentially selects the passage candidate point to which a geographical distance from the current location is the longest and extracts the traveled path having the selected passage candidate point.

2. The candidate route providing system according to claim 1,
wherein, if a travel route is set in the host vehicle, the processor sets the passage candidate point on the travel route within the predetermined range.

3. The candidate route providing system according to claim 1,
wherein the processor sets the passage candidate point at a predefined major point within the predetermined range.

4. The candidate route providing system according to claim 3,
wherein the processor sets the passage candidate point at a point located on a predefined major road at the upper-limit distance away from the current location.

5. The candidate route providing system according to claim 4,
wherein, if there are three or more points located on a predefined major road at the upper limit distance away from the current location, the processor sets passage candidate points at two points that have the longest distance on the major road among these point, and
wherein the processor extracts a first traveled path that passes through the current location and a first one of the passage candidate points and a second traveled path that passes through the current location and a second one of the passage candidate points.

6. The candidate route providing system according to claim 1,
wherein, if the host vehicle is travelling on a predefined major road, the processor setter sets the passage candidate point on the major road within the predetermined range.

7. The candidate route providing system according to claim 3,
wherein the processor selects the candidate route when no travel route is set in the host vehicle.

8. The candidate route providing system according to claim 1,
wherein, based on the travel history information, the processor selects at least one of a most frequently-traveled route, a shortest travel time route, and a shortest travel distance route from the traveled paths as the candidate route.

9. The candidate route providing system according to claim 1,
wherein the processor selects the candidate route based on at least one of a time slot, a day of the week, and a vehicle attribute as the travel history information.

10. The candidate route providing system according to claim 9,
wherein the processor uses a vehicle size as the vehicle attribute.

11. An in-vehicle apparatus which is mounted in a host vehicle and is communicative with a server that stores traveled paths of a plurality of other vehicles and travel history information associated with the traveled paths of the plurality of other vehicles, the in-vehicle apparatus comprising:
a processor,
wherein the processor sets a current location of the host vehicle,
wherein the processor sets a passage candidate point selectable by the host vehicle to pass through, within a predetermined range being a distance range between a lower-limit distance that is greater than zero and an upper-limit distance from the current location, by searching within the predetermined range, automatically excluding the distance range less than the lower-limit distance regardless of distance from the current location to a destination of the vehicle,
wherein the processor acquires the traveled paths of the plurality of other vehicles around the current location and the travel history information from the server, wherein the processor extracts, from the traveled paths of the plurality of other vehicles acquired by the processor, mutually different traveled paths each having the current location of the host vehicle as a starting point of the traveled path and the passage candidate point as a terminal point of the traveled path, wherein the processor selects, as the candidate route, at least one of the traveled paths extracted by the processor based on the travel history information associated with the traveled paths extracted by the processor, and wherein, when a plurality of the passage candidate points are set, the processor preferentially selects the passage candidate point to which a geographical distance from the current location is the longest and extracts the traveled path having the selected passage candidate point.

12. A candidate route providing method for providing a host vehicle with a candidate route as a candidate of a travel route, based on traveled paths of a plurality of other vehicles, the candidate route providing method comprising:

storing the traveled paths of the plurality of other vehicles and travel history information associated with the traveled paths of the plurality of other vehicles;

setting a current location of the host vehicle;

setting a passage candidate point selectable by the host vehicle to pass through, within a predetermined range being a distance range between a lower-limit distance that is greater than zero and an upper-limit distance from the current location, by searching within the predetermined range, automatically excluding excluding the distance range less than the lower-limit distance regardless of distance from the current location to a destination of the vehicle;

extracting, from the traveled paths of the plurality of other vehicles, mutually different traveled paths each having the current location of the host vehicle as a starting point of the traveled path and the passage candidate point as a terminal point of the traveled path; and selecting, as the candidate route to provide to the host vehicle, at least one of the extracted traveled paths based on the travel history information associated with the extracted traveled paths, wherein, when a plurality of the passage candidate points are set, preferentially selecting the passage candidate point to which a geographical distance from the current location is the longest and extracting the traveled path having the selected passage candidate point.

13. The candidate route providing system according to claim 1, wherein the processor sets a travel route of the host vehicle, and wherein the processor sets the passage candidate point based on the travel route set by the processor.

14. The candidate route providing system according to claim 1, wherein, if a travel route is set in the host vehicle, the processor sets the plurality of the passage candidate points on the set travel route, and wherein the processor preferentially selects the passage candidate point on the set travel route to which the geographical distance from the current location is the longest and extracts the traveled path having the selected passage candidate point.

15. The in-vehicle apparatus according to claim 11, wherein, if a travel route is set in the host vehicle, the processor sets the plurality of the passage candidate points on the set travel route, and wherein the processor preferentially selects the passage candidate point on the set travel route to which the geographical distance from the current location is the longest and extracts the traveled path having the selected passage candidate point.

16. The candidate route providing method according to claim 12, further comprising:

if a travel route is set in the host vehicle, setting the plurality of the passage candidate points on the set travel route; and preferentially selecting the passage candidate point on the set travel route to which the geographical distance from the current location is the longest and extracting the traveled path having the selected passage candidate point.

* * * * *